(12) United States Patent
Grisnich et al.

(10) Patent No.: US 9,023,933 B2
(45) Date of Patent: May 5, 2015

(54) AUTOXIDISABLE COATING COMPOSITION

(75) Inventors: Willem Grisnich, AW Zwolle (NL);
Fokeltje Akke Koldijk, AW Zwolle (NL); Adrianus Jozephus Hendricus Lansbergen, AW Zwolle (NL); Albertus Johannes Reuvers, AW Zwolle (NL); Stefan Hendrikus Maria Willems, AW Zwolle (NL)

(73) Assignee: DSM IP Assets B.V., Heerlen (NL)

( * ) Notice: Subject to any disclaimer, the term of this patent is extended or adjusted under 35 U.S.C. 154(b) by 647 days.

(21) Appl. No.: 13/265,194

(22) PCT Filed: Apr. 27, 2010

(86) PCT No.: PCT/EP2010/055647
§ 371 (c)(1),
(2), (4) Date: Feb. 2, 2012

(87) PCT Pub. No.: WO2010/125075
PCT Pub. Date: Nov. 4, 2010

(65) Prior Publication Data
US 2012/0128990 A1    May 24, 2012

(30) Foreign Application Priority Data
Apr. 27, 2009 (EP) .................................... 09158863

(51) Int. Cl.
| | | |
|---|---|---|
| B05D 3/02 | (2006.01) | |
| B32B 27/00 | (2006.01) | |
| B32B 27/40 | (2006.01) | |
| C08F 20/00 | (2006.01) | |
| C08F 220/18 | (2006.01) | |
| C08F 283/04 | (2006.01) | |
| C08G 8/34 | (2006.01) | |
| C08G 18/00 | (2006.01) | |
| C08G 18/08 | (2006.01) | |
| C08G 18/28 | (2006.01) | |
| C08G 18/42 | (2006.01) | |
| C08G 63/00 | (2006.01) | |
| C08G 63/48 | (2006.01) | |
| C08G 63/91 | (2006.01) | |
| C08G 73/00 | (2006.01) | |
| C08K 5/10 | (2006.01) | |
| C08K 5/101 | (2006.01) | |
| C08L 75/00 | (2006.01) | |
| C08L 93/00 | (2006.01) | |
| C09D 5/28 | (2006.01) | |
| C09D 11/10 | (2014.01) | |
| C08G 18/36 | (2006.01) | |
| C09D 175/14 | (2006.01) | |

(52) U.S. Cl.
CPC .............. *C08G 18/36* (2013.01); *C09D 175/14* (2013.01); *Y10S 525/92* (2013.01)

(58) Field of Classification Search
CPC .......... B05D 3/10; B05D 3/108; B32B 27/40; C08F 20/00; C08F 20/62; C08F 20/68; C08F 283/04; C08G 18/4288; C08G 18/82; C08G 63/00; C08G 63/48; C08G 63/91; C08L 75/14; C08L 93/00; C08L 67/08; C09D 4/06; C09D 167/08; C09D 175/14
USPC .......... 427/372.2, 385.5; 428/423.1; 524/500, 524/798, 318, 507, 589, 590; 525/54.4, 525/54.42, 440.01, 440.07, 440.071, 525/440.072, 455, 920; 527/301
See application file for complete search history.

(56) References Cited

U.S. PATENT DOCUMENTS

| 3,748,294 A | 7/1973 | Kershaw et al. |
|---|---|---|
| 2005/0042379 A1 | 2/2005 | Oostveen et al. |

FOREIGN PATENT DOCUMENTS

| EP | 1533342 | 5/2005 |
|---|---|---|
| GB | 2100271 | 12/1982 |
| WO | WO 03/064548 | 7/2003 |

OTHER PUBLICATIONS

International Search Report for PCT/EP2010/055647 mailed May 28, 2010.
Written Opinion of the International Searching Authority mailed May 28, 2010.

*Primary Examiner* — Patrick Niland
(74) *Attorney, Agent, or Firm* — Nixon & Vanderhye P.C.

(57) ABSTRACT

An autoxidisable coating composition comprising i) 10 to 60 wt % of an autoxidisable material with: a) a number average molecular weight <4500 g/mol; b) optionally 1 to 20 carbohydrate units; c) a fatty acid content of ≥60 wt %; d) a viscosity at 100% solids in the range of from 0.05 to 5 Pa·s at 20+/−5° C. at a shear rate of 5000 $s^{-1}$; ii) 90 to 40 wt % of an autoxidisable urethanised resin with: e) a number average molecular weight ≥4000 g/mol; f) a fatty acid content of ≥50 wt %; g) an acid value in the range of from 0 to 20 mgKOH/g resin; h) an isocyanate content in the range of from 1 to 35 wt % by weight of autoxidisable urethanised resin; where i)+ii)=100 wt %, based on the total solids content of the autoxidisable coating composition.

19 Claims, No Drawings

AUTOXIDISABLE COATING COMPOSITION

This application is the U.S. national phase of International Application No. PCT/EP2010/055647 filed 27 Apr. 2010 which designated the U.S. and claims priority to EP 09158863.2 filed 27 Apr. 2009, the entire contents of each of which are hereby incorporated by reference.

The invention is directed to an autoxidisable coating composition, to a substrate coated with said composition and to the use thereof.

The use of fatty acid functionalised resins in paint products has the advantage that the resins are largely derivable from agricultural products, which are renewable sources. They are also easily biodegraded when buried in landfill sites which is advantageous when large quantities of waste paint need to be discarded. However, such resins (at least when made by esterifications performed in solution) have the intrinsic problem of being extremely viscous liquids owing to the large proportion of polymer chains having high molecular weights. Therefore, the resins are usually dissolved in large amounts of volatile organic solvents to obtain a paint having a viscosity which allows it to be applied by brush at ambient temperatures to produce coatings which may be for instance up to 200 µm thick. Traditional paints containing such resins contain as much as 30 wt % or more of volatile organic solvent which is usually a hydrocarbon liquid such as white spirit. As the paint dries, the solvent evaporates creating environmental pollution and also localised unpleasant smells.

Paints for professional and do-it-yourself use are subject to increasing technical and ecological restrictions. Environmental protection calls for a reduction in emissions of volatile organic compounds (VOC). Because of environmental protection, the reduction in emissions of volatile organic compounds is required and the use of high-solid alkyd resins is one solution for this problem. According to the latest EU legislation of 2010 for solvent-borne decorative paints the content of volatile organic compounds must be reduced to 300 gl$^{-1}$.

Much attention has been directed to the replacement of at least some of the volatile organic solvent by relatively involatile reactive diluents. Reactive diluents such as drying oils, low molecular weight alkyds and methacrylate esters were reported as beneficial for formulating high solids alkyds with low VOC and low viscosity. The term reactive diluent refers to a diluent which is polymerised during curing. In general, the reactive diluent lowers the viscosity and it is believed that the reactive diluents may dilute the viscous alkyd polymer sufficiently to enable it to be brushed onto a surface, but are not lost as pollutants into the atmosphere by evaporation from a drying coating. Instead, once the paint has been applied to the surface, it is believed that the reactive diluents are reacted so becoming part of the macromolecular film. Therefore the reactive diluent no longer exists as a liquid which would either slowly evaporate causing pollution or would remain in the coating and therefore reduce the hardness of the film. In the prior art, typically very low molecular weight (less than 2,000 gmol$^{-1}$) reactive diluents are mixed with alkyd resins in relatively small amounts (such as 20 wt % based on the total weight of the composition).

Earlier attempts to prepare a high solids coating composition by mixing a traditional air drying urethanized resin with a non-carbohydrate based reactive diluent resulted in properties close to the traditional non-urethanized high solids.

WO 03/064548 describes the use of a fatty acid modified carbohydrate obtainable by the reaction of a carbohydrate and a fatty acid, as a reactive diluent in a coating comprising a binder such as a conventional air-drying alkyd resin.

WO 06/020818 discloses an esterified carbohydrate having pendant fatty acid residues and pendant (meth)acrylate groups. A composition comprising such a carbohydrate and an alkyd is also disclosed.

U.S. Pat. No. 3,748,294 shows that urethane based microgels can be combined with autoxidisable materials to obtain very short drying times and wrinkle free coatings. However the large amount of physical crosslinks will be detrimental for resistances, and the very short drying times will be detrimental for flow. Additionally, dispersions offer no flexibility in solvent content due to coagulation and settling.

For a having a balance between good flow and crosslinking rate, the viscosity of the drying coating should start low enough to allow flow, and chemically crosslink fast enough to allow good dust free drying times and hardness. Additionally, the viscosity of the diluent component should be very low to allow flexibility in solvent content.

There remains a strong need for further reduction of the volatile organic compounds content in autoxidisable coating compositions and being able to formulate high-solids, low viscosity coatings without a serious adverse effect on coating properties. It is particularly desired that the autoxidisable coating composition allows fast drying, giving a high level of hardness, good cross-link density and/or resistance against mechanical damage within a day of drying the coating.

It is the object of the invention to provide a high solid autoxidisable coating composition which results in coatings which outperform traditional high solid coatings in one or more of properties such as drying properties, hardness properties and/or mechanical properties. The inventors surprisingly found that one or more of these objects may be met by providing a composition comprising at least an autoxidisable material which has low viscosity combined with a high fatty acid content and an autoxidisable urethanised resin.

Accordingly, in a first aspect the invention is directed to an autoxidisable coating composition comprising:
  i) 10 to 60 wt %, more preferably 20 to 55 wt % and most preferably 25 to 45 wt % of an autoxidisable material with:
    a) a number average molecular weight <4500 g/mol, more preferably ≤4000 g/mol;
    b) optionally 1 to 20 carbohydrate units;
    c) a fatty acid content of ≥60 wt %;
    d) a viscosity at 100% solids in the range of from 0.05 to 5 Pa·s at 20+/−5° C. at a shear rate of 5000 s$^{-1}$;
  ii) 90 to 40 wt %, more preferably 80 to 45 wt % and most preferably 75 to 55 wt % of an autoxidisable urethanised resin with:
    e) a number average molecular weight ≥4000 g/mol;
    f) a fatty acid content of ≥50 wt %, preferably ≥60 wt %;
    g) an acid value in the range of from 0 to 20 mgKOH/g resin;
    h) an isocyanate content in the range of from 1 to 35 wt % by weight of autoxidisable urethanised resin;
where i)+ii)=100 wt %, based on the total solids content of the autoxidisable coating composition.

The autoxidisable coating composition of the invention may have exceptionally high solids content without adversely affecting the physical properties of the coating. In theory, a solids content of the composition can be 100 wt % due to the relatively low molecular weight of the autoxidisable material. In practice, the upper limit of the solids content of the composition is usually lower and can be for instance 95 wt %, or even 99 wt %.

The autoxidisable coating composition of the invention may be used as a 100% solids composition if the viscosity of the composition is suitable for application to a substrate. By solids (content) herein is meant the total resin content, i.e. the autoxidisable material i), the autoxidisable urethanised resin ii) and any further additional resin optionally added to the coating composition.

The autoxidisable coating composition of the invention may also be used in combination with a liquid medium to give a high solids content coating composition (at least 60 wt %, more preferably at least 65 wt % and most preferably at least 70 wt % solids) suitable for example for use as decorative topcoat. Such autoxidisable coating composition will typically have an application viscosity ranging from 0.2 to 1 Pa·s at 20+/−5° C. at a shear rate of 5000 $s^{-1}$.

By application viscosity herein is meant the viscosity experienced during applying the coating composition while brushing, which corresponds to a viscosity as measured at 20+/−5° C. within the shear-rate range of 5,000 to 10,000 $s^{-1}$. For the purpose of characterising the coating compositions according to the invention a temperature of 23° C. and a shear rate of 5000 $s^{-1}$ was typically used to determine the application viscosity.

Accordingly, in a second aspect the invention is directed to an autoxidisable high solids content coating composition according to the invention additionally comprising:
iii) 0.5 to 40 wt % of a liquid medium;
where i)+ii)+iii)=100 wt %, based on total amount of the autoxidisable coating composition.

More preferably, the autoxidisable coating composition according to the invention additionally comprises iii) 0.5 to 40 wt % of a liquid medium;
where i)+ii)+iii)=100 wt % based on total amount of the autoxidisable coating composition, and wherein the application viscosity ranges from 0.2 to 1 Pa·s at 20+/−5° C. and a shear rate of 5 000 $s^{-1}$.

The autoxidisable coating composition of the invention may also be used in combination with a liquid medium to give a low solids content coating composition (such as ≤60 wt %, preferably ≤70 wt % solids) suitable for example for use as a stain for wood. Such autoxidisable coating composition will typically have an application viscosity ranging from 0.04 to 0.2 Pa·s at 20+/−5° C. at a shear rate of 5000 $s^{-1}$.

Accordingly, in a third aspect the invention is directed to an autoxidisable coating composition according to the invention additionally comprising
iii) 41 to 50 wt % of a liquid medium;
where i)+ii)+iii)=100 wt %, based on total amount of the autoxidisable coating composition.

More preferably, the autoxidisable coating composition according to the invention additionally comprises: iii) 41 to 50 wt % of a liquid medium;
where i)+ii)+iii)=100 wt %, based on total amount of the autoxidisable coating composition, and wherein the application viscosity ranges from 0.04 to 0.2 Pa·s at 20+/−5° C. and a shear rate of 5 000 $s^{-1}$.

Furthermore, the autoxidisable coating composition of the invention enables a strong reduction of the amount of volatile organic compounds. This is very advantageous in view of the previously mentioned legislative restrictions on volatile organic compounds. It is for instance possible to have an autoxidisable coating composition with a volatile organic compounds content (VOC) of 300 $gl^{-1}$ or less at a viscosity of ≤1.0 Pa·s, preferably ≤0.8 Pa·s, at 20+/−5° C. and a shear rate of 5 000 $s^{-1}$. This reduction allows complying with the 2010 EU legislation of a volatile organic compound content of at most 300 $gl^{-1}$. Preferably the volatile organic compounds amounts ≤300 $gl^{-1}$, more preferably ≤290 $gl^{-1}$, even more preferably ≤285 $gl^{-1}$ and most preferably ≤250 $gl^{-1}$ from the total amount of the autoxidisable coating composition of the invention (determined as described in the experimental section).

The maximum amount of 300 $gl^{-1}$ relates to the content of volatile organic compounds in solvent-borne decorative paints having an application viscosity of from 0.2 to 1 Pa·s at 20+/−5° C. and a shear rate of 5 000 $s^{-1}$. When formulated for a different application area, such as coatings for stains, flooring coatings, coating for metal surfaces, which have lower application viscosity of from 0.04 to 0.2 Pa·s at 20+/−5° C. and a shear rate of 5 000 $s^{-1}$ the desired amount of the VOC in the autoxidisable coating composition may have some higher values, preferably up to 500 $gl^{-1}$.

Thus, a further object of the invention is to provide an autoxidisable coating composition that can be diluted to a viscosity ≤1.0 Pa·s, more preferably ≤0.8 Pa·s as measured at a shear-rate of 5000 $s^{-1}$ and a temperature of 20+/−5° C., by adding ≤300 $gl^{-1}$ of Exxsol D40, up to a maximum of 300 $gl^{-1}$ of VOC. Exxsol D40 is a hydrocarbon fluid having initial boiling point of typically 153 to 160° C., a density at 15° C. of 0.77 kg/$dm^3$ and a viscosity at 25° C. of 1.25 $mm^2$/s.

It was found that the autoxidisable coating composition of the invention may have exceptional fast drying behaviour (both at the surface and in-depth) even at low temperatures (10° C. or lower, such as 0° C.).

By autoxidisable is meant that the components can cross-link as a result from oxidation occurring in the presence of air and usually involving a free radical mechanism. Autoxidation (also known as air-drying) is preferably metal-catalysed resulting in covalent cross-links. Suitably autoxidation of the autoxidisable material i) and the autoxidisable urethanised resin ii) in the coating composition according to the invention is provided by air-drying groups that ensure the occurrence of autoxidation.

In a preferred embodiment according to the invention the autoxidisable urethanised resin and/or the autoxidisable material have air-drying groups selected from the group consisting of fatty acid groups containing unsaturated bonds, (meth)allyl functional residues, β-keto ester groups, β-keto amide groups and any combinations thereof.

The unsaturation imparts latent cross-linkability so that when a coating composition thereof is dried in the air, often in conjunction with (i.e. in the presence of) a drier salt, the coating material undergoes cross-linking by autoxidation.

Suitable unsaturated fatty acids for providing fatty acid groups containing unsaturated bond (residues) in the autoxidisable urethanised resin and/or the autoxidisable material include fatty acids derived from soyabean oil, palm oil, linseed oil, tung oil, rapeseed oil, sunflower oil, tallow oil, (dehydrated) castor oil, safflower oil and fatty acids such as linoleic acid, linolenic acid, palmitoleic acid, oleic acid, eleostearic acid, licanic acid, arachidonic acid, ricinoleic acid, erucic acid, gadoleic acid, clupanadonic acid, and/or combinations thereof.

If so desired, the unsaturated fatty acids may also be used as such wholly or in part in the form of a triglyceride, e.g., as the drying oil such as sunflower oil, soybean oil, linseed oil, tuna fish oil, dehydrated castor oil, coconut oil, and dehydrated coconut oil.

The autoxidative curing of the composition according to the invention preferably takes place at ambient temperature. The ambient temperature at which the coating is dried is meant in the context of this invention to be a temperature of from 0 to 40° C., preferably from 5 to 30° C. and most preferably from 10 to 25° C. Experimental measurements to test the coating compositions were typically done at room temperature of 20+/−5° C., preferably at a room temperature of from 23 to 25° C., unless otherwise stated.

Additionally to the curing by autoxidation, crosslinking may occur at ambient temperature by a number of other, secondary crosslinking mechanisms including but not limited to Schiff base crosslinking, Michael type additions and radical polymerisation as are well known in the art.

Such secondary curing mechanisms may be ensured by providing the autoxidisable urethanised resin ii) and/or the autoxidisable material i) with additional functionality that may provide said further crosslinking, resulting in an even faster drying process of the coating composition.

Preferably a significant part of any crosslinking reaction only takes place after application of the coating composition to a substrate, to avoid an excessive molecular weight build up which may lead to an increased viscosity of the coating composition on the substrate in the early stages of drying. Even worse, the viscosity can become too high to apply the coating composition and in the worst case the composition will gel in the can.

The autoxidisable urethanised resin ii) and the autoxidisable material i) are different compounds. The autoxidisable urethanised resin can be a mixture of different autoxidisable urethanised resins. Also, the autoxidisable material can be a mixture of different autoxidisable materials.

The autoxidisable material acts as a reactive diluent and preferably comprises a high amount of fatty acid content such as ≥60 wt %, has a low Mn such as ≤4000 g/mol and a narrow molecular weight distribution, having a polydispersity index PDi of ≤2. This is to ensure that the autoxidisable material has a molecular weight high enough to ensure the good drying properties and in the same time low enough to act as a reactive diluent. Preferably the autoxidisable material is non-urethanised (i.e. no isocyanate functional compounds are used in its preparation).

Preferably the number average molecular weight Mn, determined by gel permeation chromatography as described herein, of the autoxidisable material is ≤4000 g/mol and more preferably ≤3000 g/mol. Preferably Mn is ≥200 g/mol, more preferably ≥500 g/mol and most preferably ≥1000 g/mol. Preferably the molecular weight polydispersity index PDi (=Mw/Mn) is ≤2, more preferably ≤1.5.

Preferably the autoxidisable material i) according to the invention has a fatty acid content of ≥65 wt %, more preferably ≥70 wt %, and most preferably ≥80 wt %, based on the solids content of the autoxidisable material i). Preferably the fatty acid content of the autoxidisable material i) is ≤100 wt %, more preferably is ≤98 wt %, based on the solids content of the autoxidisable material i).

The term fatty acid used for the autoxidisable material i) and/or for the autoxidisable urethanised resin ii) is meant to include saturated fatty acids, unsaturated fatty acids and mixtures thereof.

The oil length of an alkyd type resin is defined as the number of grams of oil used to produce 100 grams of resin. The fatty acid content herein is defined as the total weight of fatty acid on total weight of monomer input. Natural oils and other sources of fatty acid are generally mixtures of saturated and unsaturated fatty acids. The unsaturated C=C content in such fatty acid sources varies in general from 23 wt % to 97 wt %. Preferably the unsaturated fatty acid content present in the autoxidisable material i) is ≥40 wt % and more preferably ≥45 wt %, based on the solids content of the autoxidisable material i).

Preferably the autoxidisable material comprises 0 to 2, more preferably 0 to 1 and most preferably no unreacted hydroxyl functional groups.

Preferably the autoxidisable material has viscosity at 100% solids in the range of from 0.1 to 0.5 Pa·s at 20+/−5° C. at a shear rate of 5000 s$^{-1}$.

A preferred example of an autoxidisable material according to the invention is an autoxidisable carbohydrate derivative. In accordance with the invention any autoxidisable carbohydrate derivative can be used. The preparation of the autoxidisable carbohydrate derivative is described in WO 03/064477A1 and WO 03/064498A1 and the use of fatty acid modified carbohydrates is described in WO 03/064548. Some of these materials are also commercially available from Procter & Gamble under the trade name Sefose™

The term carbohydrate as used herein includes monosaccharides, oligosaccharides and polysaccharides as well as derivatives thereof.

Preferably the autoxidisable carbohydrate derivative comprises 1 to 15 carbohydrate units and more preferably 1 to 4 carbohydrate units.

Preferably the autoxidisable material is selected from the group consisting of autoxidisable carbohydrate derivatives such as sucrose soyate, sucrose safflowerate or sorbitol; fatty acid esters of glycerol, diglycerol, triglycerol, pentaerythritol, dipentaerythritol and tripentaerythritol; vegetable oils; and any combinations thereof.

Preferably the sucrose is fully or partially reacted to obtain octa- (fully reacted), hepta- or hexa- (partially reacted) derivatives.

In accordance with the invention any autoxidisable urethanised resin can be used. It is evident from all the foregoing that the term "urethanised" as used in this specification can mean one or more than one urethanised resins, and is intended to apply not only to polymers (or prepolymers) having only urethane linkages formed from isocyanate and hydroxyl groups, but also to polymers, prepolymers or polymer segments having, in addition to urethane linkages, linkages formed from isocyanate groups and groups such as primary or secondary amines or thiols.

Urethanised resins are prepared from the reaction of at least an isocyanate, an alcohol, an unsaturated oil or unsaturated fatty acid and optionally diacid. Therefore, autoxidisable urethanised resins according to the invention include urethanised alkyd resins, which additionally to the components above also comprise in the backbone at least a diacid, as well as it includes urethanised oils obtained from the reaction of at least an isocyanate, an alcohol and an unsaturated oil or unsaturated fatty acid (thus no diacid is reacted into the backbone).

The urethanised alkyd resin may be prepared in conventional manner by esterification of an alcohol, a diacid and an unsaturated oil or unsaturated fatty acid at a temperature between about 230° C. and about 255° C., followed by addition reaction of at least an isocyanate at temperatures between about 30° C. and about 130° C. until reaction between the isocyanate groups and the isocyanate-reactive (usually all hydroxyl) groups is substantially complete.

The urethanised oil may be prepared in conventional manner by transesterification reaction of an alcohol and an unsaturated oil or unsaturated fatty acid under substantially anhydrous conditions, i.e. without adding water, followed by addition reaction of at least an isocyanate, at a temperature between about 30° C. and about 130° C. until reaction between the isocyanate groups and the isocyanate-reactive (usually all hydroxyl) groups is substantially complete.

The incorporation of alcohol in the autoxidisable urethanised resin is advantageous as it ensures incorporation of additional OH functionality that may react with the isocyanate.

The isocyanate used for making the autoxidisable urethanised resin is preferably an aliphatic (which term includes cycloaliphatic), araliphatic or aromatic isocyanate, or a mixture of aliphatic and aromatic isocyanates, and is preferably a diisocyanate.

Examples of suitable aliphatic isocyanates include ethylene diisocyanate, 1,6-hexamethylene diisocyanate, isophorone diisocyanate, cyclohexane-1,4-diisocyanate, 4,4'-dicyclohexylmethane diisocyanate, cyclopentylene diisoyanate, p-tetra-methylxylene diisocyanate (p-TMXDI) and its meta isomer (m-TMXDI), hydrogenated 2,4-toluene diisocyanate (TDI), hydrogenated 2,6-toluene diisocyanate, and 1-isocyanato-1-methyl-3(4)-isocyanatomethyl-cyclohexane (IMCI).

Suitable aromatic isocyanates include p-xylylene diisocyanate, 1-4-phenylene diisocyanate, 2,4-toluene diisocyanate, 2,6-toluene diisocyanate, 4,4'-diphenylmethane diisocyanate, 2,4-diphenylmethane diisocyanate, and 1,5-naphthylene diisocyanate.

Mixtures of isocyanates can be used and also isocyanates which have been modified by the introduction or urethane, allophanate, urea, biuret, carbodiimide, uretonimine or isocyanurate residues.

Preferred isocyanates are 4,4'-dicyclohexylmethane diisocyanate, isophorone diisocyanate (IPDI) and toluene-2,4-diisocyanate (TDI).

The OH-functional polymeric backbone of the autoxidisable urethanised resin is built up essentially by an OH functional alkyd or oil (thus by alcohols and fatty acid groups) and optionally may include diacids, ethers and other components with suitable functionality. Diacid is generally present in the backbone, exceptions being urethane oils.

The OH-functional polymeric backbone is preferably a polymeric polyol of functionality more than 2, but may be or include a polymeric diol. The polymeric polyol preferably has a number average molecular weight (hereinafter Mn) within the range of from 500 to 8,000 g/mol, more preferably from 700 to 3,000 g/mol. Such polyol in principle may be selected from any of the chemical classes of polymeric polyols used or proposed to be used in a urethanised resin synthesis. In particular the polymeric polyol may be a polyester polyol, a polyesteramide polyol, a polyether polyol, a polythioether polyol, a polycarbonate polyol, a polyacetal polyol, a polyvinyl polyol and/or a polysiloxane polyol. More preferably the polymeric polyol is selected from a polyester polyol, a polyether polyol and/or a polysiloxane polyol, and particularly preferably is selected from a polyether polyol and/or a polyester polyol.

Polyester polyols which may be used include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydrides or dimethyl terephthalate.

Polyesteramides may be obtained by the inclusion of amino-alchols such as ethanolamine in polyesterification mixtures. Polyesters which incorporate carboxy groups may be used, for example polyesters synthesised by esterification of dimethylol propionic acid (DMPA) and/or dimethylol butanoic acid (DMBA) with diols, provided that the esterification is carried out at temperatures below 200° C. to retain the carboxy functionality in the final polyester.

Polyether polyols which may be used include products obtained by the polymerisation of a cyclic oxide, for example ethylene oxide, propylene oxide or tetrahydrofuran or by the addition of one or more such oxides to polyfunctional initiators, for example water, methylene glycol, ethylene glycol, propylene glycol, diethylene glycol, cyclohexane dimethanol, glycerol, trimethylopropane, pentaerythritol or Bisphenol A. Especially useful polyether polyols include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran.

If desired, catalysts such as dibutyltin dilaurate or stannous octoate may be used to assist the urethanised resin formation.

Preferably the autoxidisable urethanised resin ii) is obtained by the reaction of components comprising at least 1 to 35 wt %, more preferably from 7 to 28 wt %, even more preferably from 10 to 25 wt % of an isocyanate, by weight on solid autoxidisable urethanised resin ii).

In a preferred embodiment according to the invention the autoxidisable urethanised resin ii) comprises components:
  a) from 50 to 80 wt % and more preferably from 60 to 80 wt % of at least an unsaturated oil or unsaturated fatty acid;
  b) from 1 to 20 wt % of a polymeric polyol;
  c) from 0 to 30 wt % of a diacid;
  d) from 1 to 35 wt %, more preferably from 7 to 28 wt % and most preferably from 10 to 25 wt % of an isocyanate,
  wherein a)+b)+c)+d)=100 wt %, based on the total solids content of the autoxidisable urethanised resin ii).

Preferably the number average molecular weight Mn, determined by gel permeation chromatography as described herein, of the autoxidisable urethanised resin is ≥4000 g/mol and more preferably ≥5600 g/mol. Preferably Mn of the autoxidisable urethanised resin is ≤10,000 g/mol and more preferably ≤7900 g/mol.

Preferably the weight average molecular weight Mw, determined by gel permeation chromatography (GPC) as described herein, of the autoxidisable urethanised resin is ≤150,000 g/mol and more preferably ≤135,000 g/mol. Urethanised resins with a weight average molecular weight of more than 200 000 g/mol tend to be very viscous and result in autoxidisable coating compositions that are more difficult to apply with a brush. However, other techniques may be employed to apply such coatings to a substrate. Preferably Mw of the autoxidisable urethanised resin is ≥20,000 g/mol and more preferably ≥25,000 g/mol.

The content (wt %) of fatty acid residues is defined as the number of grams of fatty acid (calculated as its triglyceride) used to produce 100 g of the autoxidisable urethanised resin or the carbohydrate derivative. This content is closely related to the physical properties such as solubility, hardness, gloss, colour retention, weather resistance, hardening time and durability of for example paint formulations comprising a composition according to the invention.

It was found advantageous for the viscosity of the autoxidisable coating composition that the autoxidisable urethanised resin ii) has a fatty acid content of ≥50 wt %, more preferably ≥52 wt %, even more preferably ≥55 wt %, and most preferably in the range of 60 to 75 wt %, based on the solids content of the autoxidisable urethanised resin ii). Preferably the unsaturated fatty acid content present in the autoxidisable urethanised resin ii) is ≥35 wt % and more preferably ≥40 wt %, based on the solids content of the autoxidisable urethanised resin ii).

Preferably the autoxidisable urethanised resin has an acid value in the range of from 0 to 15 mgKOH, more preferably from 0 to 10 mgKOH and most preferably from 0.5 to 6 mgKOH. The acid value is determined by titration according to ISO 2110, wherein tetrahydrofuran is used as solvent.

The autoxidisable coating composition of the invention may comprise a liquid medium, such as an organic solvent.

Non-limiting examples of suitable organic solvents are aliphatic, cycloaliphatic, and aromatic hydrocarbons, alcohol ethers, and alcohol ether acetates or mixtures thereof. As examples of such solvents may be mentioned hydrocarbon solvents available under the trademarks Shellsol H, Shellsol K, and Shellsol AB, all from Shell Chemicals, the Netherlands; the trademarked Solvesso 150, Exxsol D30, Exxsol D40 and Exxsol D60 solvents from Esso; ester solvents such as ethyl diglycol, ethyl glycol acetate, butyl glycol, butyl glycol acetate, butyl diglycol, butyl diglycol acetate, and methoxypropylene glycol acetate; and ketone solvents like methyl ethyl ketone (MEK), acetone, methyl isobutyl ketone (MIBK) and methyl amyl ketone (MAK). Mixtures of solvents may also be used. Preferably the solvent is an aliphatic solvent and most preferably the solvent is Exxsol D40.

Less that 10 wt % water based on the total composition may be added to the coating compositions according to the invention without influencing their properties. Adding water is understood herein as adding an additional co-solvent and not as a medium for emulsification.

In a further aspect the invention is directed to a method for preparing an autoxidisable coating composition of the invention comprising for example mixing at elevated temperature the autoxidisable urethanised resin with the autoxidisable material. By elevated temperature here is meant a temperature suitable to make the two components of the invention workable from viscosity point of view (i.e. mixable one into the other).

The autoxidisable urethanised resin and the autoxidisable material are preferably mixed at an elevated temperature. The mixing temperature is preferably ≥40° C. but below the boiling temperature of the solvent(s), even more preferably ranging from 40 to 100° C. The mixing of the two components may be done in any order. Preferably the mixing temperature is in a range from 50 to 90° C. This allows a reasonable viscosity to be maintained in the reactor for preparing the blend while at the same time avoiding the use of VOC's, in order to make a high solids composition.

The composition of the invention is particularly suitable for use in coatings or coating compositions in which it may provide a key part of coating compositions or formulations. Such coating compositions can be pigmented or unpigmented and may be used as primer, as a topcoat, as a high-gloss or matte coating, as a stain-resistant coating, a wood oil, a wall paint or a flooring paint.

A further object of the invention is to provide an autoxidisable coating composition having a maximum of 300 gl$^{-1}$ of volatile organic compounds at a pigment volume concentration (PVC) of up to 40 vol %, preferably up to 20 vol % and most preferably up to 15 vol %. A pigment volume concentration is defined as:

$$\frac{[\text{volume (pigment)} + \text{volume (filler)}]}{[\text{volume (pigment)} + \text{volume (filler)} + \text{volume (binder)}]}$$

wherein "binder" refers to the volume of total polymer (i.e. resin) in the composition, including the autoxidisable urethanised resin ii), any other resin added to the coating composition and the autoxidisable material i).

In yet a further aspect the invention is directed to a paint comprising an autoxidisable coating composition according to the invention. The term "paint" in this respect is meant to designate collectively coating materials such as paints, varnishes, enamels, and the like lacquer for architectural or industrial use for indoor as well as for outdoor applications.

Accordingly, in a further embodiment of the invention there is provided a coating, a polymeric film, a printing ink and/or an overprint lacquer obtainable from the coating composition of the present invention.

The composition of the invention may be used in various applications, and for such purposes may be further optionally combined or formulated with other additives or components (to form compositions), such as pigments (for example titanium dioxide, iron oxide, chromium based compounds and/or metal phthalocyanine compounds), dyes, defoamers, rheology control agents, thixotropic additives, thickeners, dispersing and stabilising agents (usually surfactants), heat stabilisers, matting agents such as silica, wetting agents, levelling agents, anti-cratering agents, fillers, extenders, sedimentation inhibitors, UV absorbers, antioxidants, drier salts, fungicides, bacteriocides, waxes, organic co-solvents, wetting agents and the like introduced at any stage of the production process or subsequently. It is possible to include an amount of antimony oxide to enhance the fire retardant properties.

Drier salts act as a catalyst for the autoxidation reaction which is initiated on drying. Drier salts are preferably comprised in the autoxidisable coating composition of the invention. Examples of suitable drier salts include polyvalent salts containing cobalt, calcium, copper, zinc, iron, zirconium, manganese, barium, zinc, strontium, lithium and potassium as the cation and halides, nitrates, sulphates, acetates, naphthenates or acetoacetonates as the anion. The amount of drier salt used can be in the range of from 0 to 1 wt % metal content by weight of the total amount of autoxidisable solids in the composition of the invention.

The composition of this invention may also contain various other ingredients such as extenders (e.g. calcium carbonate and china clay) and dispersants such as pigment dispersion aids.

Such additives are commercially available. However, it is to be understood that these additives are not needed to obtain the properties as described in this invention and they are not added when they negatively affect the coating properties.

In a further aspect the invention is directed to a method for applying the autoxidisable coating composition of the invention on a substrate, comprising adding to the coating composition a drier salt and drying the coating composition.

The composition once applied may be allowed to dry naturally at ambient temperature and more preferably the drying process may be accelerated by heat at a temperature above ambient temperature.

In yet a further aspect the invention is directed to a substrate coated with the autoxidisable coating composition of the invention. Suitable substrates include wood, metal, stone, plastics and plastic films like polyethylene or polypropylene, especially when the films are treated with plasma; fibre (including hair and textile), glass, ceramics, plaster, asphalt, concrete, leather, paper, foam, masonry and/or board. Wood and wooden based substrates like MDF (medium density fibreboard) or chip boards are the most preferred substrates.

Application to a substrate may be by any conventional method including brushing, dipping, flow coating, spraying, roller coating, pad coating, flexo printing, gravure printing, ink-jet printing, any other graphic arts application methods and the like. For spraying, further dilution of the composition with a suitable solvent (for example acetone) may be needed to achieve the best results.

There is further provided according to the invention a substrate carrying a pigmented or non-pigmented coating derived from a coating composition of the invention.

There is further provided according to the invention a method of coating a substrate which comprises applying a coating composition obtained by a process as defined above to a substrate and drying the composition to obtain a coating. The coating according to the invention may be primer coating or a topcoat.

The autoxidisable coating composition of the invention can further be advantageously applied in one or more of the following applications: adhesives (such as pressure sensitive adhesives, hot melt, contact and laminating adhesives or adhesion promoters), high yield primers, high yield topcoats, high gloss coatings, matte coatings, stain resistant coatings, wood oil, wall paint, flooring paint, metal applications as used already for alkyds (coils, drums, chairs), inks, toners, wetting agents, pigment dispersants, paper coatings, automotive protective and maintenance, flexible packaging, coil coatings, sheet moulding, powder coatings, and spray paints.

The present invention is now further illustrated but in no way limited by reference to the following examples. Unless otherwise specified all parts, percentages and ratios are on a weight basis. The term comparative means that it is not according to the invention.

Measuring Techniques

Viscosity

As used herein, with the term "viscosity" is meant to refer to the viscosity measured with a Physica MCR301 rheometer using a cone/plate measuring system characterised by a cone diameter of 25 mm and a cone angle of 1°. Viscosity has been measured at a shear-rate of $5000\,s^{-1}$ and temperature of 23° C. Viscosity measured at a shear rate of $5\,000\,s^{-1}$ is considered to be responsible for the 'brush resistance' experienced during applying the coating composition (=application viscosity).

VOC

Where a VOC of a film forming material is mentioned below, it refers to the VOC measured after adding cobalt, zirconium, calcium and Exkin 2 (anti-skinning agent) and diluting this paint with Exxsol D40 down to a viscosity value of 0.4-0.47 Pa·s, measured at 23° C. and $5\,000\,s^{-1}$. Determination of VOC was done as following: first measure specific weight of the paint ($kg/m^3$); then the solid content (%) was measured and then the VOC was calculated according to the formula:

VOC in $gl^{-1}$=((100−solids content)*density)/100

The method to determine VOC is ISO 11890-1: 2000(E).

The density of the compositions was measured according to ISO 2811-2: 1997(E).

The method to determine the volatile percentage was according to ISO 3251: 1993(E).

Molecular Weights

The molecular weights (Mn and Mw) referred to in this application are the values as determined on an Alliance Waters 2695 GPC with two consecutive PL-gel columns, type Mixed-B, l/d=300/7.5 mm (Polymer Laboratories), size of column particles 10 μm, using stabilised tetrahydrofuran (THF) (BHT stable) modified with 0.8% acetic acid as the eluent at 1 mL/min at 40° C. and using an Alliance Waters 2414 refractive index detector at 40° C. A set of polystyrene standards with a molecular weight range of 162 to $7.10^6$ $gmol^{-1}$ was used to calibrate the GPC equipment.

Cotton Wool Adhesion Test (Stage 1 of Drying)

From a practical point of view it makes sense to discriminate between 3 stages of drying. The first stage of drying is finished when the autoxidation results into solidification of the surface of the film. The very moment of surface solidification was quantified by the Cotton Wool Adhesion Test.

The cotton wool adhesion test measures the rate of surface drying of a coating film. The cotton wool adhesion test was conducted on a coating film applied with a 100 μm slit applicator on a glass plate. After applying the coating composition, a swatch of cotton wool (a lose ball of approximately 0.2 g and a diameter of approximately 3 cm) was dropped from a height of 5 cm on the paint film. After 10 seconds the glass panel was turned over 180° and it was observed if the cotton wool drops off without leaving cotton fibres on the surface. When the cotton wool did not stick to the surface, the time was recorded. This is the dust free time.

Indentation Test (Stage 2 of Drying)

The second stage of drying is finished when the coating film has been solidified over its full film height. The drying stage must be finished as soon as possible in order to achieve anti-blocking properties and to enable sanding of the coating film after one night drying. This 'in-depth' solidification of the coating film is quantified by the Indentation Test, performed after 20 hours drying of a coating film applied on a glass plate with a 200 μm slit applicator. The glass plate was positioned on the bottom plate of a Physica MCR 301 rheometer and the distance between the glass plate and the indentor was determined. Subsequently a rod-shaped indentor with a diameter of 3.5 mm was pressed on to the paint film with a force of 20 N. As long as the lower part of the paint film was not sufficiently cured to withstand the pressure applied, it was squeezed out between the indentor and the glass plate. The distance between the tip of the indentor and the glass plate that remained after 5 minutes pressing was used as a measure for the in-depth drying. The larger this distance was, the better the in-depth drying. The test was performed at 23° C.

Mechanical Properties of the Solidified Coating (Stage 3 of Drying)

After completion of the in-depth solidification the $3^{rd}$ stage begins during which the mechanical properties of the solidified coating (such as $T_g$ and hardness) can be measured. Mechanical properties have been measured on 20 μm thick films after 24 hours drying, using two different techniques.

A traditional Labotron pendulum hardness tester was used to measure the König pendulum hardness according to DIN 53157/1-87.

A Physica MCR 301 rheometer was used to perform a dynamic mechanical analysis as a function of temperature according to the following procedure:

After 24 hours of drying, the solidified films were removed from their glassy substrate with a razor blade. Subsequently, the free films were folded into 20 layers in order to achieve sufficient sample height for a small and accurate oscillatory shear deformation. Pill-shaped samples (with a diameter of 8 mm and a height of about 400 μm) were then made out of the stacked films. At a temperature of 80° C., the sample was clamped in between the parallel plates of the rheometer, applying a normal force of 30 Newton. Subsequently the sample was cooled down from 80° C. to −20° C. at a cooling rate of 4° C./min. While cooling down the sample was subjected to a very small oscillatory shear deformation γ(t) with amplitude $γ_o$ of 0.002 and at a frequency of 1 Hz. Both the oscillating deformation γ(t) and the resulting oscillating shear stress τ(t) were measured as a function of temperature. From this test the following properties were determined:

The Hardness

The hardness of a visco-elastic solid material like a cured paint can be considered to be proportional to the ratio of the shear stress amplitude $\tau_o$ and the shear deformation amplitude $\gamma_o$. This ratio is called the dynamic modulus of elasticity and is denoted by $G_o$:Hardness $\propto G_o = \tau_o/\gamma_o$.

The Glass Transition Temperature ($T_g$)

As is well known, the glass transition temperature of a polymer is the temperature at which it changes from a glassy brittle state to a rubbery state. Here the $T_g$ has been defined as the temperature at which the phase shift $\delta$ between the oscillating stress and deformation reaches its maximal value (W. Schlesing, M. Buhk, M. Osterhold, 'Dynamic mechanical analysis in coatings industry', Prog. Org. Coat. 49 (2004) 197).

Cross-link Density

At temperatures above the $T_g$ a cross-linked material is in the rubbery state. The hardness in the rubbery state originates from the presence of a (cross-linked) network. According to the theory of rubber elasticity (A. V. Tobolsky, 'Properties and Structure of Polymers', John Wiley & Sons (1960)) the (shear) modulus G' at the rubber plateau is proportional to the number of network chains per unit volume, N $[m^{-3}]$:G'=NkT; here k and T represent the Boltzmann constant ($1.38 \times 10^{-23}$ $JK^{-1}$) and the temperature [in K degree] respectively.

Materials Used:

Nuodex Co 10, Nuodex Zr 12 and Nuodex Ca 5 are drier salts available from Elementis.

Exkin 2 is an antiskinning agent available from Elementis.

Exxsol D40 is a non-aromatic solvent available from Exxon Mobil Chemical.

Sefose 1618UC as used herein is a solvent free sucrose soyate produced by Procter & Gamble having a Mn of 2400 g/mol, 1 carbohydrate unit, a fatty acid (soybean) content of 87% (with unsaturated fatty acid content of approximately 73 wt %) and a viscosity at 100% solids at 25° C. at a shear rate of 5000 $s^{-1}$ was of 0.36 Pa·s, wherein the octa-, hepta- and the hexa-derivatives amount a minimum of at least 97% and the octa component at least 70% of the total sucrose.

Uralac AD44 Q-70 is an alkyd resin available from DSM NeoResins B.V. with a solid content of 70% in Exxsol D40, a Mn of 3900 g/mol and a Mw of 23,000 g/mol, a (soybean) fatty acid content of 60% (on solid resin, having unsaturated fatty acid content of approximately 50 wt %) and an acid number of 5-10 mg KOH/g.

Uralac AR202 Q-60 is a TDI (toluene-2,4-diisocyanate) based urethanized alkyd resin available from DSM NeoResins B.V. with a solid content of 60% in Exxsol D40, an isocyanate content of 17.6% (on solid urethanised resin, having unsaturated fatty acid content of approximately 45 wt %), a Mn of 7900 g/mol and a Mw of 130,000 g/mol, a (soybean) fatty acid content of 54% (on solid urethanised resin) and an acid number of ≤5 mg KOH/g.

Uralac OR317 W-60 is a TDI based urethanized oil available from DSM NeoResins B.V. with a solid content of 60% in White Spirit (available from Shell), an isocyanate content of 22.4% (on solid urethanised resin), a Mn of 6900 g/mol and a Mw of 41,000 g/mol, a (soybean/linseed 50/50) fatty acid content of 65% (on solid urethanised resin, having unsaturated fatty acid content of approximately 55 wt %) and an acid number of ≤3 mg KOH/g.

Uralac AL210 Q-55 is an IPDI (isophorone diisocyanate) based urethanized alkyd resin available from DSM NeoResins B.V. with a solid content of 55% in Exxsol D40 (Exxon Mobil Chemical), an isocyanate content of 7.4% (on solid urethanised resin), a Mn of 4900 g/mol and a Mw of 48,000 g/mol, a (soybean) fatty acid content of 55% (on solid urethanised resin, having unsaturated fatty acid content of approximately 46 wt %) and an acid number of ≤6 mg KOH/g.

The fatty acid and unsaturated fatty acid contents (in wt %) given in the experimental section were all calculated based on 100% solids of the corresponding resins.

Preparation of the Autoxidisable Coating Composition

The compositions were prepared by mixing the components at room temperature of 20+/−5° C. in weight ratios specified below in table 1 and were tested for their properties (as described in Table 1 below). Preparation at room temperature instead of the high temperature range as given above was in this case possible as on labscale no heating was needed due to the different dimensions of the mixing system. The mixing ratios of the components have been chosen such as to result into a solid binder content (including the urethanised resin, any further resin added to the coating composition and the autoxidisable material) of 65 wt % and an application viscosity of about 0.4 Pa·s at 23° C. at a shear rate of 5000 $s^{-1}$.

Preparation of a Dipenta Oil Autoxidisable Material 906 g of soya fatty acid, 151 g of dipentaerythritol and 50 g of xylene were charged to a reactor and heated to 250° C. under azeotropic conditions. Distillation was stopped when the acid value reached below 4 mg KOH/g for the autoxidisable material. Finally, the xylene was stripped under vacuum conditions at 200° C. Thereafter, the autoxidisable material was discharged. The average molecular weights were established by gel permeation chromatography. Mn was 2200 $gmol^{-1}$ and Mw was 2450 $gmol^{-1}$. The fatty acid content was 86% (with unsaturated fatty acid content of approximately 72 wt %) and the viscosity at 100% solids at 25° C. at a shear rate of 5000 $s^{-1}$ was 0.2 Pa·s.

By Dipenta oil herein is meant the fatty acid hexaester of dipentaerythritol.

COMPARATIVE EXAMPLE I

Non-Urethane/Non-Sucrose Reference

The coating composition of comparative Example I was obtained by mixing with a normal lab stirrer 45 g of Uralac AD44 Q-70 with 11.24 g of Dipenta oil (preparation is described above), 2.89 g Nuodex Ca 5, 0.43 g Nuodex Co 10, 2.19 g Nuodex Zr 12, 0.56 g Exkin 2 and 5.49 g Exxsol D40.

COMPARATIVE EXAMPLE II

Non-Urethane Reference

The coating composition of comparative Example II was obtained by mixing with a normal lab stirrer 45 g of Uralac AD44 Q-70 with 12.28 g of Sefose 1618UC, 2.89 g Nuodex Ca 5, 0.43 g Nuodex Co 10, 2.19 g Nuodex Zr 12, 0.56 g Exkin 2 and 5.49 g Exxsol D40.

EXAMPLE III

The coating composition of Example II was obtained by mixing with a normal lab stirrer 25.5 g of Uralac AR202 Q-60 with 19.5 g of Dipenta oil (preparation is described above), 4.7 Exxsol D40, 2.3 g Nuodex Ca 5, 0.34 g Nuodex Co 10, 1.75 g Nuodex Zr 12 and 0.45 g Exkin 2.

EXAMPLE IV

The coating composition of Example IV was obtained by mixing with a normal lab stirrer 25.5 g of Uralac AR202 Q-60 with 19.5 g of Sefose 1618UC, 4.7 g Exxsol D40, 2.3 g Nuodex Ca 5, 0.34 g Nuodex Co 10, 1.75 g Nuodex Zr 12 and 0.45 g Exkin 2.

EXAMPLE V

The coating composition of Example V was obtained by mixing with a normal lab stirrer 38.00 g of Uralac OR317 W-60 with 12.00 g of Dipenta oil (preparation is described above), 2.3 g Nuodex Ca 5, 0.34 g Nuodex Co 10, 1.75 g Nuodex Zr 12 and 0.45 g Exkin 2.

EXAMPLE VI

The coating composition of Example VI was obtained by mixing with a normal lab stirrer 38.00 g of Uralac OR317 W-60 with 12.00 g of Sefose 1618UC, 2.30 g Nuodex Ca 5, 0.34 g Nuodex Co 10, 1.75 g Nuodex Zr 12 and 0.45 g Exkin 2.

EXAMPLE VII

The coating composition of Example VII was obtained by mixing with a normal lab stirrer 32.2 g of Uralac AL210 Q-55 with 17.1 g of Dipenta oil (preparation is described above), 2.3 g Nuodex Ca 5, 0.34 g Nuodex Co 10, 1.75 g Nuodex Zr 12 and 0.45 g Exkin 2.

EXAMPLE VIII

The coating composition of Example VIII was obtained by mixing with a normal lab stirrer 32.2 g of Uralac AL210 Q-55 with 17.1 g of Sefose 1618UC, 2.30 g Nuodex Ca 5, 0.34 g Nuodex Co 10, 1.75 g Nuodex Zr 12 and 0.45 g Exkin 2.

m In Table 1 it can be seen that the comparative examples I and II have larger dust-free time and lower indentation and Konig hardness, a lower $G_0$ and G' than examples III to VIII made according to the invention. The experimental results therefore show that the coating compositions according to the invention (as exemplified by examples III to VIII) outperform the comparative coating compositions I and II, by having a better drying (as shown by the dust free time and the indentation measurements), an increased hardness (as shown by the Konig hardness and $G_0$ data) and a higher crosslink density (as shown by the G' experimental data).

First a polyol precursor was prepared by heating a mixture of 729 parts of linseed oil fatty acid; 324 parts of pentaerythritol; 290 parts of tung oil; 166 parts of phthalic anhydride and 160 parts of xylene to 210° C. under reflux in a glass reactor fitted with stirrer, nitrogen inlet and Dean-Stark water separator. The resin was cooled down at an acid value below 0.8 mgKOH/g and 500 parts of white spirit were added.

In a second step a urethane composition was prepared by loading a similar glass reactor with 165 parts of white spirit and heating to 130° C. A solution of 192.5 parts of polyol precursor from the first step with 0.2 parts dibutyl tin dilaurate was added in 3.5 hours. At the same time a solution of 23.2 parts of toluene diisocyanate in 17.5 parts of white spirit was added as a separate stream. After 1 hour post reaction, 1 part of n-butanol was added. The resulting product was low in viscosity and clear, had a fatty acid content of 57 wt % and unsaturated fatty acid content of approximately 53 wt %. The urethane product from the second step was combined with a white spirits based, 52% solid content, 50% oil length (corresponding to approx. 48 wt % fatty acid content) linseed/tung (35/15) glycerol phthalate alkyd (with an unsaturated fatty acid content of approximately 42 wt %). Two mixtures were formulated at 50/50 and 40/60 weight ratios (on solids basis), which were found to have the viscosity, solids content (SC) and dilution behavior as shown in table 2 below.

TABLE 2

|  | Mixture | |
| --- | --- | --- |
|  | 1 | 2 |
| Alkyd solids (parts) | 50 | 60 |
| Urethane solids (parts) | 50 | 40 |
| Viscosity at 23° C. (Pas) | 4.6 | 8.0 |
| Solids content (%) | 58.3 | 56.9 |
| SC (%) at viscosity 0.6 Pas | 48 | 38 |

Mixture 1 and 2 are non-pigmented versions of enamel 1 and 2 described in example 23 of U.S. Pat. No. 3,748,294. Both mixtures show a viscosity of about 5 Pas at about 57% solids content (SC). Diluting the mixtures 1 and 2 to a viscosity of 0.6 Pas gave a solids content of 48%, or 38% respectively (see last row in table). It is clear from these values that viscosity at a VOC of 300 g/l is much higher than 0.6 Pa·s (extrapolation of the experimental results gives a rough estimate of >50 Pa·s for 300 g/l VOC content).

It is also clear that the autoxidisable material used in these examples (i.e. the tung/linseed alkyd) has a fatty acid content of about 46%, while its viscosity was measured to be about 9

TABLE 1

| wt % solids | TDI or IPDI on total solid of mixture | Viscosity 5000 s$^{-1}$, 23° C. [Pas] | Dust-free Time 100 μm | Indentation 200 μm, 20 hours drying [μm] | 50 μm wet thickness, 24 hours drying | | | |
| --- | --- | --- | --- | --- | --- | --- | --- | --- |
|  |  |  |  |  | Konig Hardness nr of swings | $G_o$ 20° C. [MPa] | $T_g$ ° C. | G' ($T_g$ + 50° C.) [MPa] |
| C-Ex I | 0 | 0.44 | 3 h · 15 m | 24 | 21 | 4.7 | 15.1 | 0.8 |
| C-Ex II | 0 | 0.45 | 3 h · 00 m | 23 | 23 | 6.3 | 17.3 | 0.8 |
| Ex III | 7.9 | 0.44 | 2 h · 10 m | 63 | 28 | 11 | 19.3 | 1.0 |
| Ex IV | 7.9 | 0.47 | 1 h · 55 m | 63 | 34 | 17 | 22.8 | 1.2 |
| Ex V | 14.3 | 0.40 | 1 h · 55 m | 45 | 32 | 20 | 24.8 | 1.1 |
| Ex VI | 14.3 | 0.41 | 1 h · 40 m | 43 | 49 | 39 | 29.4 | 1.4 |
| Ex VII | 2.7 | 0.43 | 2 h · 30 m | 45 | 24 | 6.5 | 16.3 | 0.9 |
| Ex VIII | 2.7 | 0.46 | 2 h · 10 m | 44 | 28 | 10 | 19.1 | 1.1 |

COMPARATIVE EXAMPLE III

A polyurethane alkyd composition was prepared and formulated according to Example 23 of U.S. Pat. No. 3,748,294.

Pa·s at 1000 s$^{-1}$ (at 52% solids content). The viscosity at 5000 s$^{-1}$ was too high to be measured.

The invention claimed is:

1. An autoxidisable coating composition comprising:
   i) 10 to 60 wt % of an autoxidisable material having:
      a) a number average molecular weight <4500 g/mol;
      b) optionally 1 to 20 carbohydrate units;
      c) a fatty acid residue content of ≥60 wt %; and
      d) a viscosity at 100% solids in the range of from 0.05 to 5 Pa·s at 20+/−5° C. at a shear rate of 5000 s$^{-1}$; and
   ii) 90 to 40 wt % of an autoxidisable urethanised resin which is a reaction product of at least an isocyanate, an alcohol, and an unsaturated oil or an unsaturated fatty acid, wherein the autoxidisable urethanised resin has:
      e) a number average molecular weight ≥4000 g/mol;
      f) a fatty acid residue content of ≥50 wt %;
      g) an acid value in the range of from 0 to 20 mgKOH/g resin;
      h) an isocyanate content in the range of from 1 to 35 wt % by weight of autoxidisable urethanised resin; and
   wherein i)+ii)=100 wt % based on total solids content of the autoxidisable coating composition.

2. An autoxidisable coating composition according to claim 1 additionally comprising:
   iii) 0.5 to 40 wt % of a liquid medium;
   wherein i)+ii)+iii)=100 wt % based on total amount of the autoxidisable coating composition.

3. An autoxidisable coating composition according to claim 2, wherein the composition has a volatile organic compound (VOC) level of 300 gl$^{-1}$ or less at a viscosity ≤0.6 Pa·s at 20+/−5° C. and a shear rate of 5 000 s$^{-1}$.

4. An autoxidisable coating composition according to claim 1 additionally comprising:
   iii) 41 to 50 wt % of a liquid medium;
   wherein i)+ii)+iii)=100 wt %, based on total amount of the autoxidisable coating composition.

5. An autoxidisable coating composition according to claim 4, wherein the composition has a volatile organic compound (VOC) level of 500 gl$^{-1}$ or less at a viscosity ≤0.2 Pa·s at 20+/−5° C. and a shear rate of 5 000 s$^{-1}$.

6. An autoxidisable coating composition according to claim 1, wherein the autoxidisable urethanised resin and/or the autoxidisable material have at least one air-drying group selected from the group consisting of fatty acid groups containing unsaturated bonds, (meth)allyl functional residues, -keto ester groups, -keto amide groups and combinations thereof.

7. An autoxidisable coating composition according to claim 1, wherein the composition is curable by autoxidation at ambient temperature.

8. An autoxidisable coating composition according to claim 1, wherein the autoxidisable material is selected from the group consisting of autoxidisable carbohydrate derivatives; fatty acid esters of glycerol; fatty acid esters of diglycerol; fatty acid esters of triglycerol; fatty acid esters of pentaerythritol; fatty acid esters of dipentaerythritol; fatty acid esters of tripentaerythritol; vegetable oils; and combinations thereof.

9. An autoxidisable coating composition according to claim 1 wherein the autoxidisable material comprises 0 to 2 unreacted hydroxyl functional groups.

10. An autoxidisable coating composition according to claim 1 wherein the autoxidisable urethanised resin is either:
    1) an autoxidisable urethanised alkyd which is a reaction product comprising at least:
       a) an isocyanate,
       b) an alcohol,
       c) an unsaturated oil and/or unsaturated fatty acid, and
       d) a diacid; or
    2) an autoxidisable urethanised oil which is a reaction product comprising at least:
       a) an isocyanate,
       b) an alcohol, and
       c) an unsaturated oil and/or unsaturated fatty acid.

11. An autoxidisable coating composition according to claim 1, wherein the autoxidisable urethanised resin comprises at least 5 to 35 wt % of an isocyanate, by weight on solid autoxidisable urethanised resin.

12. An autoxidisable coating composition according to claim 1, wherein the autoxidisable urethanised resin comprises a polymeric polyol of functionality ≥2 and a number average molecular weight Mn within the range of from 500 to 8,000 g/mol.

13. An autoxidisable coating composition according to claim 2, wherein the composition has a maximum of 300 gl$^{-1}$ of volatile organic compounds at a pigment volume concentration (PVC) of ≤40 vol %.

14. An autoxidisable coating composition according to claim 1, wherein the autoxidisable urethanised resin is a reaction product comprised of:
    a) from 50 to 80 wt % of at least an unsaturated oil or unsaturated fatty acid;
    b) from 1 to 20 wt % of a polymeric polyol;
    c) from 0 to 30 wt % of a diacid; and
    d) from 1 to 35 wt % of an isocyanate,
    wherein a)+b)+c)+d)=100 wt %, based on the total solids content of the autoxidisable urethanised resin.

15. The autoxidisable coating composition according to claim 8, wherein the autoxidisable material is at least one autoxidisable carbohydrate derivative selected from the group consisting of sucrose soyate, sucrose safflowerate and sorbitol.

16. A paint composition comprising an autoxidisable coating composition according to claim 1, and at least a drier salt.

17. A method for coating a substrate comprising applying the autoxidisable coating composition according to claim 1 onto a substrate, and then drying the applied coating composition.

18. A substrate coated with the autoxidisable coating composition according to claim 1.

19. An indoor or outdoor coating material which comprises the autoxidisable coating composition according to claim 1.

* * * * *